United States Patent [19]

Burkhart

[11] 4,126,944
[45] Nov. 28, 1978

[54] DISPOSABLE SWITCH PLATE AND RECEPTACLE COVER SPIRIT LEVEL

[76] Inventor: David H. Burkhart, 121 Ashe Ave., Raleigh, N.C. 27605

[21] Appl. No.: 858,547

[22] Filed: Dec. 8, 1977

[51] Int. Cl.² ............................................. G01C 9/28
[52] U.S. Cl. .................................... 33/347; 33/371; 33/DIG. 10
[58] Field of Search ................. 33/347, 334, 370, 371, 33/181, 333, DIG. 10

[56] References Cited

U.S. PATENT DOCUMENTS

| | | | |
|---|---|---|---|
| 3,116,563 | 1/1964 | Gelbman | 33/371 X |
| 3,123,918 | 3/1964 | Crabtree | 33/371 X |
| 3,126,776 | 3/1964 | Whistler et al. | 33/181 |
| 3,279,080 | 10/1966 | Stepshinski | 33/181 |
| 3,422,544 | 1/1969 | Wyse | 33/333 |
| 3,766,657 | 10/1973 | Hopkins | 33/371 |

Primary Examiner—Charles E. Phillips
Attorney, Agent, or Firm—Mills & Coats

[57] ABSTRACT

In abstract a preferred embodiment of the present invention is a disposable spirit level adapted to be removably attached to a switch plate or receptacle cover whereby the same may be easily leveled and aligned during installation. The disposable level of the present invention incorporates a weak cement bond to removably secure the same to the switch plate or receptacle cover until such time as the switch plate or receptacle cover is installed and properly aligned.

3 Claims, 3 Drawing Figures

DISPOSABLE SWITCH PLATE AND RECEPTACLE COVER SPIRIT LEVEL

FIELD OF THE INVENTION

The present invention relates to spirit levels and more particularly to disposable spirit levels that may be used for alignment and leveling of switch plates and receptacle covers.

BACKGROUND OF THE INVENTION

In the construction industry, a considerable amount of labor is performed in an inefficient manner. For instance, the use of unskilled labor requires that many jobs have to be constantly checked as to their quality and quite often the redoing of a poorly executed task is necessary. Additionally, many jobs require an efficient step-by-step construction in order to obtain the finished product.

One such facet of construction that requires a step by step procedure to complete pertains to electrical wiring and installation of junction boxes, switches and receptacles. It can be especially appreciated by one skilled in the art that the proper installation of switches and receptacles is a time consuming operation.

The procedure for properly installing a switch or receptacle is as follows: Initially, a switch or receptacle box is secured to a wall stud, the wiring is attached to the switch or receptacle and the switch or receptacle is then secured to the box. The switch plate or receptacle cover may now be attached to the switch or receptacle with a fastening means provided. The commonly used attachment allows for switch plate or receptacle cover to be secured in an unleveled orientation. In order for the switch plate or receptacle cover to be properly aligned, a worker must go back and with a hand level, orient the individual plate or cover properly.

This operation is time consuming and often times forgotten thereby giving the appearance of shoddy workmanship. Therefore, the proper installation of switch plates or receptacle covers is of some importance.

Installations of switches and receptacles must produce both a functional and properly appearing device. Functional in that the switch or receptacle is safe to use and in fact works. On the other hand, the proper appearance of the switch or receptacle is not necessary for the item to work, but when switch plates and receptacle covers are leveled and aligned the overall appreciation of a well constructed building is improved.

SUMMARY OF THE INVENTION

The present invention presents a disposable spirit level having a sighting glass for readily viewing the indicated orientation of the level with respect to horizontal. Additionally, the disposable spirit level of the present invention incorporates a generally planar back area whereby the disposable level is adapted to be held adjacent a switch plate or receptacle cover by an adhesive interface disposed therebetween.

In view of the above, it is an object of the present invention to provide a disposable spirit level that provides a means whereby a switch plate or receptacle cover may be readily installed in a proper orientation.

A further object of the present invention is to provide a disposable spirit level which incorporates an adhesive backing whereby the same may be held removably adjacent a switch plate or receptacle cover.

Another object of the present invention is to provide a disposable spirit level which incorporates a first and second layer adhesive backing wherein said first adhesive backing is disposed adjacent the disposable spirit level of the present invention and the second adhesive backing is disposed adjacent the switch plate or receptacle cover to which the disposable spirit level is attached.

An even further object of the present invention is to provide a disposable spirit level having a first and second layer of adhesive backing wherein said first layer forms a permanent bond, and when the disposable spirit level is removed from the switch plate or receptacle cover the second adhesive layer is readily pulled away from the switch plate or receptacle cover.

In addition, another object of the present invention is to provide a disposable spirit level whose generally planar rear surface incorporates serrations whereby an adhesive backing may be held more permanently thereto.

Another object of the present invention is to provide disposable spirit level which is simple in construction, economical to produce, and disposable thereby providing a maintenance free item which readily assists in the proper installation of switch plates and receptacle covers.

Other objects and advantages of the present invention will become apparent from a study of the following description and the accompanying drawings which are merely illustrative of the present invention.

DETAILED DESCRIPTION OF THE FIGURES

Figure 1:
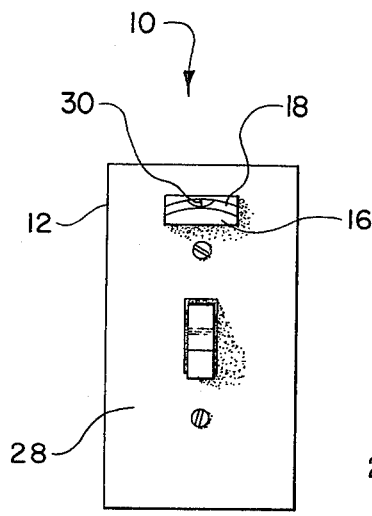
FIG. 1 is a front elevational view of the disposable spirit level of the present invention being attached to a switch plate.
Figure 2:
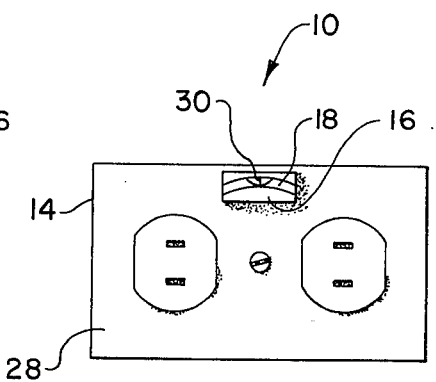
FIG. 2 is a front elevational view of the disposable spirit level of the present invention being attached to a receptacle cover.

Viewing the Figures in greater detail, particularly FIGS. 1 and 2, a disposable spirit level is shown therein and indicated generally by the numeral 10. As illustrated in FIGS. 1 and 2, the disposable spirit level of the present invention is shown removably attached to a switch plate 12 and receptacle cover 14, respectively.

The disposable spirit level 10 comprises a housing 16 by which a liquid filled bulb 18 is supported. Additionally, by viewing FIG. 3, which is an exploded side elevational view of the disposable spirit level of the present invention, one may observe the particular components of the same. By viewing FIG. 3, the housing 16 is shown therein as having a generally planar serrated rear surface 20 against which an adhesive interface 22 is disposed.

Figure 3:
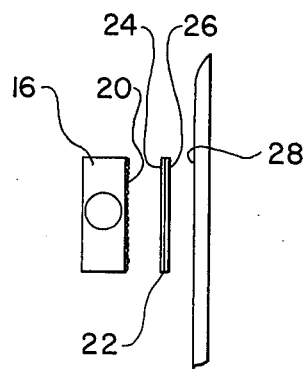
FIG. 3 is an exploded side elevational view of the disposable spirit level of the present invention being shown adjacent the front surface of a switch plate or receptacle cover.

Adhesive interface 22 comprises a first permanent adhesive layer 24 and a second weak adhesive layer 26. As seen in FIG. 3, the adhesive interface 22 is oriented such that the same is bonded to the planar serrated surface 20 of housing 16 by the permanent adhesive layer 24. Thus when constructed as a unit, disposable spirit level 10 may be secured and removably attached adjacent the switch plate or receptacle cover surface as represented at numeral 28 in FIG. 3.

In actual application, the disposable spirit level of the present invention is secured to a switch plate or receptacle cover such that the same is parallel to the edge or the plate or cover which will be uppermost when installed. This parallel alignment of the spirit level to the plate or cover edge will allow for horizontal orientation of the same. Therefore, upon installation of the switch plate or receptacle cover, the installer observes the bulb 18 and when the leveling indicia 30 indicates a horizontal orientation has been obtained, the switch plate or receptacle cover is secured in place.

After having properly aligned and secured the plate or cover in place, the installer removes the disposable spirit level and discards the same. It should be appreciated that the particular embodiment of the adhesive interface prevents any adhesive residue from being left on the plate or cover when the spirit level is removed.

After viewing the preferred embodiment herein described, one skilled in the art will appreciate the value of this device with regard to the efficient installation of switch plates and receptacle covers. Additionally, the disposable spirit level of the present invention is a device which is simple in construction, economical to produce, and a virtual maintenance free one-use disposable item.

The terms "uppermost," "rear," etc., have been used herein merely for the convenience of the foregoing specification and in the appended Claims to describe the disposable switch plate and receptacle cover spirit level and its parts as oriented in the drawings. It is to be understood, however, that these terms are in no way limiting to the invention since the disposable switch plate and receptacle cover spirit level may obviously be disposed in many different positions when in actual use.

The present invention, of course, may be carried out in other specific ways than those herein set forth without departing from the spirit and essential characteristics of the invention. The present embodiments are, therefore, to be considered in all respects as illustrative and not restrictive, and all changes coming within the meaning and equivalency range are intended to be embraced herein.

What is claimed is:

1. A device for aiding in proper orientation of covers for components of electrical systems comprising: in combination, a cover having an exposed surface; and a level indicating means removably attached to said surface whereby proper orientation of the cover can be assured during installation of the same and the level can be disposed of when such installation is completed; means includes a liquid filled bulb type bubble spirit level having a front and back; a plurality of serrations disposed over at least a portion of the back of said level; a relatively flat interface having front and back surfaces, a relatively permanent adhesive layer disposed on the front surface of said interface whereby said interface can be permanently secured to the serrated rear surface of said level; and a relatively weak adhesive layer disposed on the rear surface of said interface whereby said interface can be removably attached to the front of said plate or cover to allow level determination and orientation of the same during installation and said level can be removed when said installation is completed.

2. A leveling means for switch plate and receptacle cover type articles comprising: a liquid filled bulb type bubble spirit level having a front and back; a plurality of serrations disposed over at least a portion of the back of said level; a relatively flat interface having front and back surfaces; a relatively permanent adhesive layer disposed on the front surface of said interface whereby said interface can be permanently secured to the serrated rear surface of said level; and a relatively weak adhesive layer disposed on the rear surface of said interface whereby said interface can be removably attached to the front of said plate or cover to allow level determination and orientation of the same during installation and said level can be removed when said installation is completed.

3. The means of claim 2 whereby said bulb has a centering indicia marked thereon.

* * * * *